April 6, 1954
L. A. RICHARDS
2,674,490
METHOD AND APPARATUS FOR IRRIGATING PLANTS
Filed June 24, 1948
4 Sheets-Sheet 1
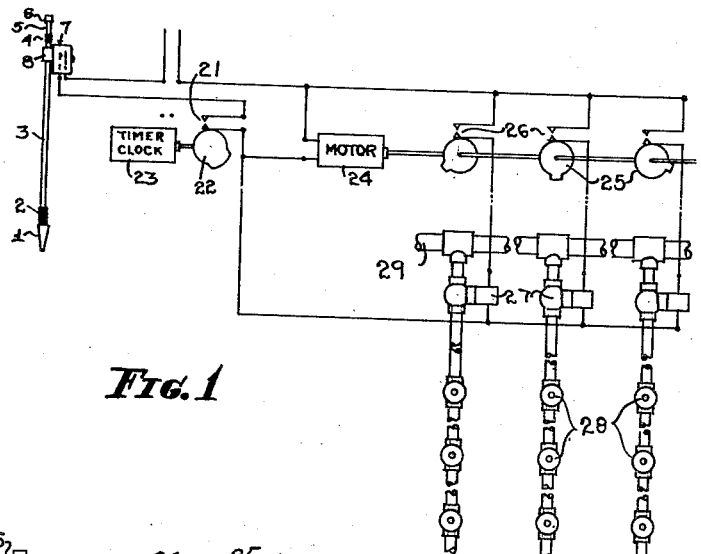
Fig. 1
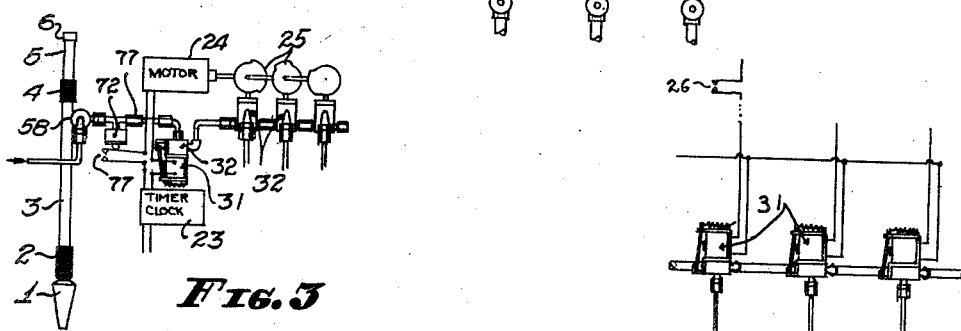
Fig. 3
Fig. 2
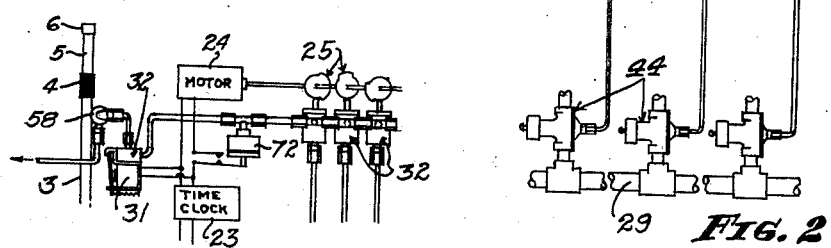
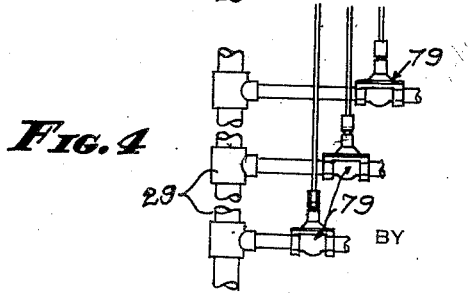
Fig. 4
INVENTOR.
LORENZO A. RICHARDS
BY Lloyd Spencer
ATTORNEY April 6, 1954
L. A. RICHARDS
2,674,490
METHOD AND APPARATUS FOR IRRIGATING PLANTS
Filed June 24, 1948
4 Sheets-Sheet 2
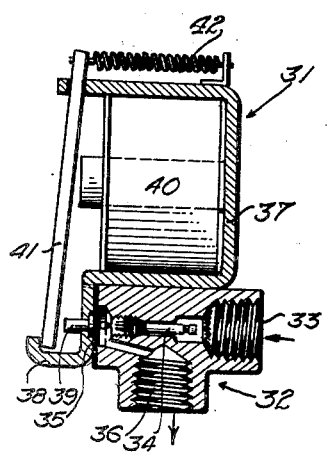
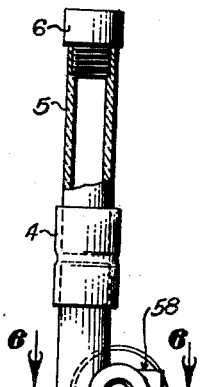
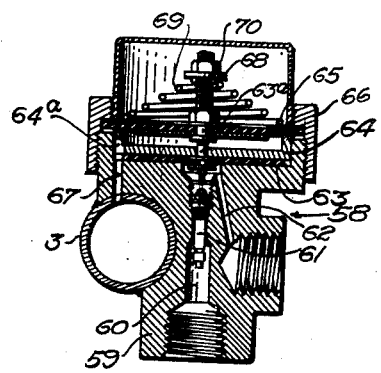
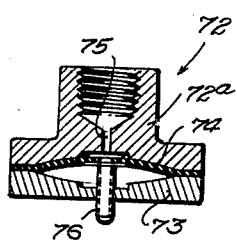
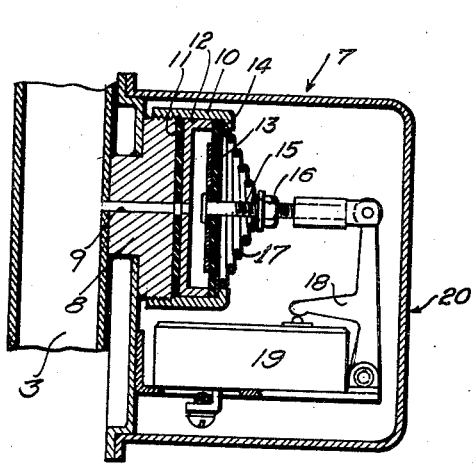
INVENTOR.
LORENZO A. RICHARDS
BY Lloyd Spencer
ATTORNEY April 6, 1954  L. A. RICHARDS  2,674,490
METHOD AND APPARATUS FOR IRRIGATING PLANTS
Filed June 24, 1948  4 Sheets-Sheet 3
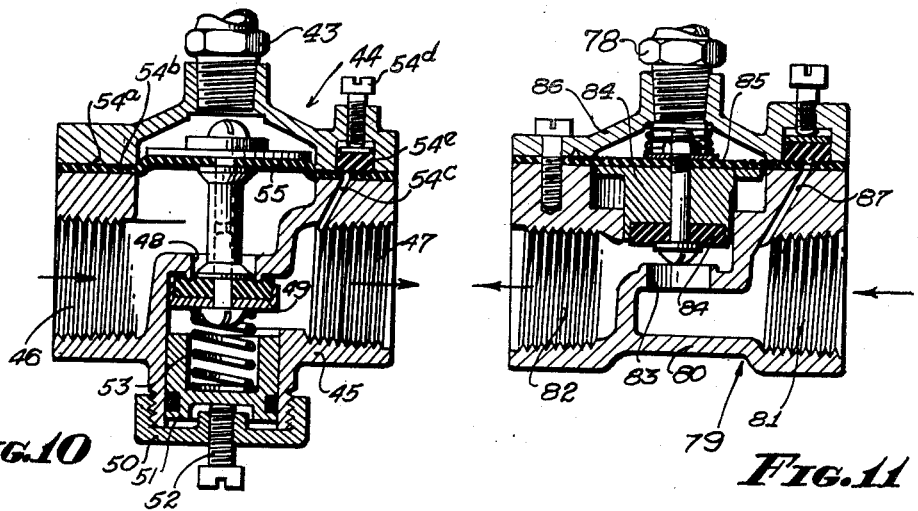
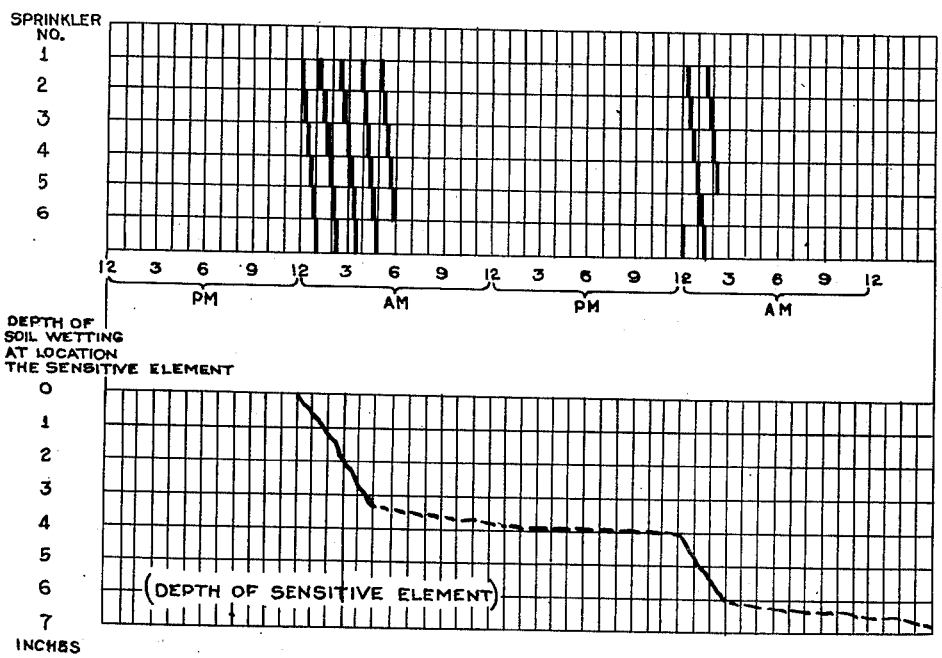
INVENTOR.
LORENZO A. RICHARDS
BY Lloyd Spencer
ATTORNEY INVENTOR.
LORENZO A. RICHARDS
BY Lloyd Spencer Patented Apr. 6, 1954

2,674,490

UNITED STATES PATENT OFFICE 2,674,490

METHOD AND APPARATUS FOR IRRIGATING PLANTS

Lorenzo A. Richards, Riverside, Calif.

Application June 24, 1948, Serial No. 34,946

10 Claims. (Cl. 299—25)

My invention relates to method and apparatus for irrigating plants, and is a continuation-in-part of my co-pending application, Serial Number 606,109, filed August 6, 1945 now Patent No. 2,445,717.

Included in the objects of my invention are:

First, to provide a method and apparatus of this character whereby completely automatic control of the irrigation of plants may be attained, the water being supplied when the soil moisture has been depleted to a predetermined point and discontinued when the soil has reached field capacity.

Second, to provide a method and apparatus of this character which employs a sensitive device which responds directly to soil moisture and a multiple outlet irrigation system controlled thereby whereby a relatively large area may be automatically irrigated.

Third, to provide a method and apparatus of this character which may incorporate a time control whereby irrigation may only occur at selected times of the day or night, providing the soil moisture conditions warrant, as reflected by the sensitive element.

Fourth, to provide a method and apparatus of this character which is extremely flexible; that is, may be adapted to the wide range of conditions and may be employed to supply water to virtually all types of plants, such as, grasses, shrubs, flowers, trees, fruits, vegetable or field crops.

Fifth, to provide a method of irrigating plants which employs a multiple outlet sprinkling system, and enables the sprinkler outlets to operate at maximum sprinkler efficiency while preventing or at least minimizing run-off of excessive water and to decrease the pipe size and hence cost of sprinkler installations.

Sixth, to provide certain novelly arranged and constructed valve mechanisms which are particularly adapted to my method and apparatus of irrigating plants.

Seventh, to provide on the whole a method and apparatus for irrigating plants which effects a substantial saving in the amount of water used while promoting better plant growth.

With the above and other objects in view as may appear hereinafter, reference is directed to the accompanying drawings, in which:

Figure 1 is a diagrammatical view of an irrigation system employing one form of my automatic irrigation apparatus, involving a soil moisture sensitive element, timer means, sequencing means and sprinkler sections wherein electrical circuits are employed between the sensitive element and the sprinkler sections.

Figure 2 is a diagrammatical view showing a portion of a modified irrigation system wherein the sequencing means and sprinkler systems are hydraulically connected.

Figure 3 is a further modified arrangement wherein hydraulic means are employed in conjunction with the moisture sensitive element and the sequencing means, the system being actuated by flow of pressure fluid.

Figure 4 is an arrangement similar to Fig. 3 wherein the system is actuated by bleeding of the pressure fluid.

Figure 5 is an enlarged elevational view of the soil moisture sensitive element, adapted for hydraulic control, as employed in Figs. 3 and 4.

Figure 6 is an enlarged sectional view thereof taken through 6—6 of Fig. 5.

Figure 7 is a fragmentary sectional view of the soil moisture sensitive element as adapted for electrical control, as employed in Fig. 1.

Figure 8 is a sectional view illustrating the operating portion of a fluid pressure switch as shown diagrammatically in Figs. 3 and 4.

Figure 9 is a sectional view of an electrically operated valve means as employed in Figs. 2, 3 and 4.

Figure 10 is a sectional view illustrating a pilot line controlled sprinkler section valve as employed in Fig. 2.

Figure 11 is a sectional view illustrating a pilot line controlled sprinkler section valve as employed in Fig. 4.

Figure 12 is a representative chart showing graphically my method of effecting automatic irrigation.

Figure 13:
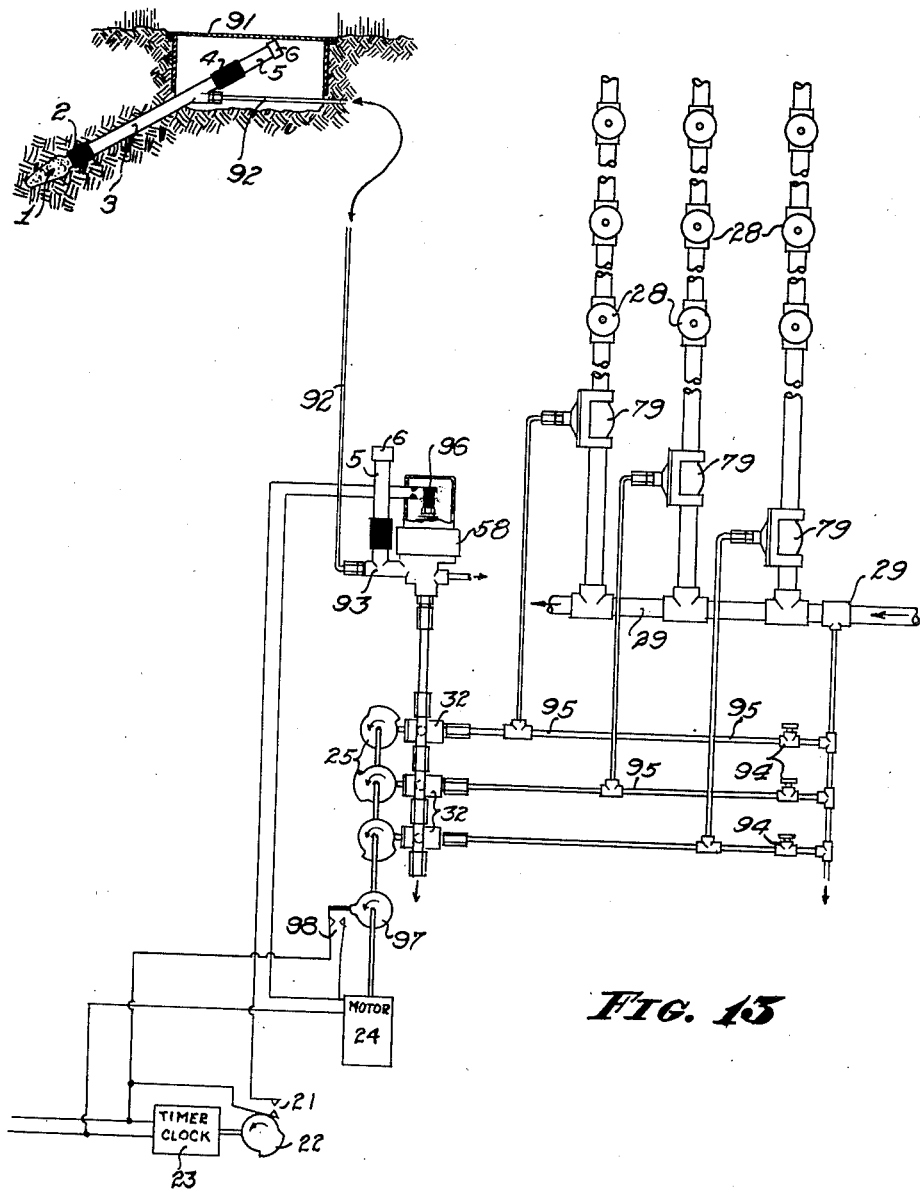
Figure 13 is a diagrammatical view of a further modified form of my irrigation system.

Reference is first directed to Fig. 1. The apparatus here illustrated diagrammatically includes a soil moisture sensitive element 1 which is in the form of a porous cup connected by a yieldable coupling sleeve 2 to a tube 3 which is in turn connected by a second coupling sleeve 4 to a transparent sight tube 5 capped by a screwthreaded plug 6. This construction is illustrated in detail in Fig. 5.

The interior of the tube 3, sensitive element 1 and sight tube 5 is completely filled with water, preferably free or virtually free of occluded gases. The sensitive element is buried in the soil to some optimum depth which reflects the conditions to be measured. When the soil moisture is at field capacity, the pressure within the tube 3 will be below but nearly equal to atmospheric pressure. As the soil moisture is depleted a negative (or vacuum) pressure will be established within the tube 3. The negative pressure thus created is employed to actuate a switch unit 7, one form of which is illustrated in Fig. 7.

The switch unit 7 includes a boss 8 secured to the side of the tube 3 and having a port 9 communicating with the interior thereof. The boss is threaded to receive an open, flanged cap 10. Clamped by means of the cap against the end of the boss 8 is a sealing washer 11, a perforated spacer cup 12, a diaphragm 13, and a ring 14. The cup 12 forms a chamber behind the diaphragm 13 to expose the diaphragm to the pressure existing in the tube 3.

The diaphragm 13 carries a stem 15 having a threaded portion which carries a tension nut 16. Interposed between the tension nut and the ring 14 is a spring 17, the force of which determines the pressure at which the diaphragm will depress. The stem 15 may, by suitable means such as a lever 18, operate a switch 19. A suitable housing 20 may be provided to protect the switch and associated mechanism.

The switch unit 7 is connected in series with a timer switch 21 which is operated by a cam 22 driven by a timer clock 23. The switch unit 7 and timer switch 21 when both are closed cause operation of a sequencing motor 24. The sequencing motor 24 drives a series of cams 25 which, in predetermined sequence, operate a series of sprinkler section switches 26.

Each sprinkler section switch controls a solenoid operated sprinkler section valve 27. Each sprinkler section valve controls a series of sprinkler units 28 or other water outlets supplied from a main line 29.

The control system thus described may be arranged so that watering can only take place at selected times of the day or night; for example, between midnight and six a. m. If during selected periods or preceding the selected period the soil moisture conditions cause the switch unit 7 to function, the sprinkler system will be cause to operate as dictated by the timer clock. Should the amount of water be insufficient during the selected period the system will shut off and remain dormant until the next period. In addition, as will be brought out hereinafter, I employ a special cycling method to minimize run-off and conserve substantially the amount of water used.

While an essentially electrical control system may be employed, it is desirable in some cases to employ a hydraulic control system between the central control, represented by the cams 25, and the sprinkler units. This may be accomplished by the arrangement shown in Fig. 2. The cams 25 are caused to operate relatively small solenoid actuated pilot valves 31, illustrated in detail in Fig. 9. Each pilot valve 31 includes a valve body 32 having an inlet 33 controlled by a valve element 34 which may take the form of a conventional tire valve. The valve element is covered by a small diaphragm 35. An outlet 36 communicates with a small chamber between the diaphragm and the valve element. A solenoid frame 37 includes an armature retaining tongue 38 which overlies the diaphragm 35 and is secured thereover by screws, not shown. An actuator pin 39 is mounted in an aperture in the tongue 38 to engage the valve element through the diaphragm 35. A solenoid coil 40 is supported in the frame 27 and actuates an armature 41 which overlies the actuator pin 39. The armature 41 is normally held clear of the pin 39 by means of a spring 42.

Operation of each pilot valve 31 by the corresponding cam 25 causes flow of water through a pilot line 43 controlled by the valve element 34. Each pilot line is connected by a booster valve 44 which may be in the form shown in Fig. 10. The valve here shown includes a valve body 45 defining an inlet 46 and an outlet 47 connected by a port 48 controlled by a valve head 49. The valve head 49 moves in a valve chamber closed at its extremity by a cap 50. Slidably mounted in the valve chamber is a piston 51. The piston 51 is engaged by an adjustment screw 52 fitted in the cap 49 to regulate the maximum open position of the piston 51. A spring 53 may be interposed between the piston 51 and the valve head 49 to aid in closing the valve.

The valve body 45 defines a cavity exposing the inlet side of the port 48 and covered by a cap 54 the margins of which clamp a diaphragm 55. The diaphragm is connected by a stem 56 to the valve head. The cap 54 is provided with a threaded boss for connection to the pilot line 43. Water line pressure acting on the under side of the diaphragm 55 closes the valve port 48. Application of water line pressure to the pilot line 43 equalizes the force across the diaphragms and the valve port opens under the action of line pressure.

In order to "bleed" the pilot line, the cap 54 is provided with an annular groove 54a confronting the diaphragm 55 over which is placed an annular screen 54b. Opposite the outlet port there is provided a small bleeder passage 54c communicating through the diaphragm, and the margin of the cap 54. Within the cap 54 the passage is threaded to receive an adjustment screw 54d, and is counterbored to receive a rubber disk 54e and backing washer. Adjustment of the screw 54d regulates the rate at which water is bled into the downstream side of the line.

Reference is directed to Fig. 3. In this arrangement small cam actuated pilot valves may be used which may take the form of the pilot valves 31 shown in Fig. 9, except that the cams 25 may operate directly on the actuator pins 39 in place of the armature 41. While a soil moisture sensitive element employing the switch unit 7 may be used, Fig. 3 illustrates a modified arrangement wherein a vacuum operated valve 58 is used such as shown in more detail in Figs. 5 and 6. The vacuum valve here illustrated comprises a valve body 59 secured to the tube 3. The valve body is provided with an axially disposed inlet passage 60 in which is set a valve 61 such as a tire valve. The stem of the valve 61 extends into a counterbore at one end of the valve body with which communicates an outlet passage 62. The counterbore and corresponding end of the valve body is covered by a diaphragm gasket 63. The gasket is held by a retainer cup 64 having marginal flanges on which rest the periphery of a main diaphragm 65. A clamping ring 66 secures the diaphragm 65 in place. A passage 67 at the margin of the gasket 63 communicates between the interior of the tube 3 and the interior of the cup 64 so as to expose one side of the main diaphragm 65 to negative pressure.

The gasket 63 is slightly less in diameter than the retainer cup 64 to provide a small annular passage intersected by the passage 67. A port 64a (which is rotated for illustration into the plane of the sectional view) in the rim of the retainer cup 64 is provided at the upper side thereof so that by "pumping" the diaphragm 65 a few times air entrapped behind the diaphragm will be worked through the passage 67 and into tube 3.

The retainer cup is provided with a central perforation which receives an actuator pin 63a adapted to depress the gasket 63 to open the valve 61. The main diaphragm carries a central stem 68 which engages the actuator pin. The stem 68 and diaphragm 65 are urged outwardly by a spring 69 interposed between the margins of the diaphragm and an adjustable nut 70. Adjustment of the spring 69 determines the vacuum pressure required to operate the valve 61.

The vacuum valve unit 58 is connected by a small pressure line 71 to the series of pilot valves 32 controlled by the cams 25 so that the pilot valves 32 cannot function unless the vacuum valve unit 58 is open. Interposed in the pressure line 71 is a pressure switch 72, as shown in Fig. 8, which may involve a body 72a and cover 73 between which is interposed a diaphragm 74 one side of which is exposed through a passage 75 to the pressure line 71. The diaphragm 74 actuates a pin 76 which operates contacts 77 to control a circuit to the cam or sequencing motor 24. This circuit is also controlled by the timer clock 23. The timer clock also energizes a solenoid operated pilot valve 31 interposed in the pressure line 71.

The systems shown in Figs. 2 and 3 may be termed "pressure" systems, inasmuch as pressure in the pilot lines causes operation of the booster valves. The systems may also be arranged so that pressure in the pilot lines holds the booster valves closed, the booster valves opening when the pilot lines are "bled." This arrangement is illustrated in Fig. 4. In this case the cam actuated pilot valves 32 are arranged to bleed water from pilot lines 78 connected to bleeder actuated booster valves 79 which may take the form shown in Fig. 11.

With reference to Fig. 11, the booster valve 79 includes a valve body 80 having an inlet 81 and an outlet 82 connected by a port 83 controlled by a valve head 84. The valve head is mounted on a diaphragm 85 clamped by a diaphragm plate 86. The diaphragm plate 86 is connected to the pilot line 78. The diaphragm plate 86 is similar to the diaphragm cap 54 and is provided with a bypass 87 similar to the bleeder passage 54c, which, however, communicates with the pressure or intake side 81 of the valve. Thus, a limited flow of water may occur from the inlet side of the valve into the space between the diaphragm 85 and the plate 86 should the pilot line be open. Under such conditions the valve head is caused to open. When flow in the pilot line is shut off, back pressure on the diaphragm forces the valve head to close the port 83.

It will thus be seen that any of the control systems shown in Figs. 1, 2, 3, or 4 or many combinations thereof may be employed to control a simple or an elaborate and extensive sprinkling system or other irrigating system. To effect such control it is, of course, essential that a location for the sensitive element 1 be chosen which is representative of the average conditions throughout the area controlled thereby.

It is important to note that the soil is not maintained in a saturated or near saturated condition; instead the soil is subjected to dry and wet cycles between controlled limits so that air may be drawn into the soil and in general the most optimum conditions for plant growth maintained.

Previous attempts to establish wet and dry cycles based on a rigid time schedule have been at best only partly effective as the moisture demand varies over wide ranges depending upon temperature humidity and plant growth. My irrigation system overcomes this as the cycle period is not constant but varies directly with demand.

Control of the dry cycle by means of the sensitive element prevents excessive depletion of moisture. If the soil moisture is allowed to fall too low, the plant growth stops and in extreme cases the plants will die.

Reference is now directed to the graph, Fig. 12. It is preferred to operate sprinkler systems at or near full capacity so as to obtain maximum coverage from each outlet. Usually this means that the water is applied faster than it can be absorbed into the soil. In the exercise of my method of irrigation, I cause the sequencing cams to turn on each sprinkler section for a relatively short time at a rate for maximum coverage, then, before run-off occurs, the next section is operated and so on until all sprinkler sections have operated, whereupon discharge through each section is repeated. This repeated cycling is continued until the sensitive element or the clock turns the system off. If the interval allotted by the timer clock does not permit sufficient wetting for the sensitive element to operate the cycling is interrupted, but continues later when permitted by the timer clock at the point where it previously stopped.

This is illustrated in Fig. 12, which indicates that at midnight the sprinkler system started, due to the fact that the sensitive element had caused operation of its vacuum switch or vacuum valve during the preceding day, the sprinkler system went through four cycles before the timer clock stopped further operation. Then, the next night the cycling began again at midnight and cut off at three-thirty a. m. due to moisture reaching the sensitive element.

Reference is now directed to Fig. 13. The irrigation system here illustrated involves the essential elements shown in the preceding figures. In this case the sensitive element 1 and its tube 3 and a sight tube 5 may be buried at a suitable station; for example, the upper end of tube 3 and the sight tube may be within a small housing 91 set in the ground. Tubing 92 of small diameter leads from the tube 3 to valve 58 which may be at a central control station. The valve 58 as shown in Fig. 13 is provided with a fitting 93 which carries a second sight tube 5. As in the previous structures the tube 3, tubing 92, sight tubes 5 and all parts in the closed system therewith is filled with water.

The valve 58 may serve to bleed water from any of a series of cam actuated valves 32 which, in turn bleed valves 79 similar to the arrangement in Fig. 4. In Fig. 13, however, the adjustable leak controlled by the adjustment screw 54d is omitted. Instead a small valve 94 is set in a line 95 which intersects the line between each valve 32 and its corresponding valve 79. Each valve 94 is so adjusted that its capacity is less than the discharge through valves 32 and 58 so that the valves 79 may be opened when bleeder valves 32 and 58 open, and close by the supply through valve 94 when the bleeder valves are closed.

As in Fig. 4 cams 25 driven by motor 24 control the valves 32. The motor 24 is, in the arrangement shown in Fig. 13, not only controlled by switch 21 of the timer clock 23, but also by a switch 96 actuated by the stem 68 of the valve 58. Switches 21 and 96 are in series so that both must be closed to operate the cam motor 24. In order that the cams will complete the irrigation cycle, a cam 97 is provided which operates a switch 98 disposed in parallel with the switches 21 and 96.

The system involving the sensitive element 1, tubing 92 and sight tubes 5 is filled with water as in the first described structures. The two sight tubes aid in bleeding all air from the system.

Having thus described certain embodiments of my invention, I do not desire to be limited thereto, but intend to claim all novelty inherent in the appended claims.

I claim:

1. A moisture sensitive instrumentality, comprising: a sealed tubular structure including a porous wall portion adapted to be inserted in the soil, said porous wall portion being in physical contact with the soil, said tubular structure adapted to be filled with water, whereby the water therein reflects the moisture tension of the surrounding soil, to create a corresponding vacuum within said structure; means defining a diaphragm chamber in communication with said tubular structure, said means including a major diaphragm and a minor diaphragm mechanically connected, said major diaphragm being responsive to vacuum pressure within said tubular structure to actuate said minor diaphragm; and a device externally of said diaphragm chamber controlled by said minor diaphragm.

2. A moisture sensitive instrumentality, comprising: a sealed tubular structure including a porous wall portion adapted to be inserted in the soil, said porous wall portion being in physical contact with the soil, said tubular structure adapted to be filled with water, whereby the water therein reflects the moisture tension of the surrounding soil, to create a corresponding vacuum within said structure; means defining a diaphragm chamber in communication with said tubular structure, said means including a major diaphragm and a minor diaphragm mechanically connected, said major diaphragm being responsive to vacuum pressure within said tubular structure to actuate said minor diaphragm; and a valve controlled by said minor diaphragm.

3. A moisture sensitive instrumentality, comprising: a sealed tubular structure including a porous wall portion adapted to be inserted in the soil, said porous wall portion being in physical contact with the soil, said tubular structure adapted to be filled with water, whereby the water therein reflects the moisture tension of the surrounding soil, to create a corresponding vacuum within said structure; means defining a diaphragm chamber in communication with said tubular structure, said means including a major diaphragm and a minor diaphragm mechanically connected, said major diaphragm being responsive to vacuum pressure within said tubular structure to actuate said minor diaphragm; a pilot valve controlled by said minor diaphragm; and a booster valve responsive to flow through said pilot valve.

4. An apparatus for automatically irrigating plants, comprising: a water filled, sealed instrumentality including a porous wall in physical contact with the soil whereby a vacuum pressure may develop in said instrumentality reflecting the moisture condition of the soil; a vacuum responsive pilot valve and a switch controlled by said instrumentality; an irrigation system operatively associated with said pilot valve and including a plurality of outlets adapted to be operated in sequence; and timer means operatively associated with said switch for controlling the operational sequence of said outlets.

5. An apparatus for automatically irrigating plants, comprising: a porous cell adapted for physical contact with the soil; a vacuum sensitive valve at a station remote from said cell; tubing connecting said cell and valve, and defining therewith a closed system adapted to be filled with water whereby a vacuum pressure may develop in proportion to the moisture condition of the soil; and an irrigation system including main valves responsive to operation of said vacuum sensitive valve.

6. An apparatus for automatically irrigating plants, comprising: a porous cell adapted for physical contact with the soil; a vacuum sensitive switch at a station remote from said cell; tubing connecting said cell and switch and defining therewith a closed system adapted to be filled with water whereby a vacuum pressure may develop in proportion to the moisture condition of the soil; and an irrigation system responsive to operation of said switch.

7. An apparatus for automatically irrigating plants, comprising: a porous cell adapted for physical contact with the soil; a vacuum sensitive means for actuating a pilot valve and switch at a remote station from said cell; tubing connecting said cell and vacuum sensitive means and defining therewith a closed system adapted to be filled with water whereby a vacuum pressure may develop in proportion to the mosture condition of the soil; an irrigation system operatively associated with said pilot valve and including a plurality of outlets adapted to be operated in sequence; and timer means operatively associated with said switch for controlling the operational sequence of said outlets.

8. An apparatus for automatically irrigating plants, comprising: a series of sprinkler sections each having at least one irrigation outlet and a control valve therefor; means for actuating said sprinkler sections in sequence; timer means for limiting operation of said actuating means to predetermined intervals of sufficient duration to cause repeated operation of at least one of said control valves; and a device including a porous member exposed to soil in the region served by said sprinkler sections, a closed liquid filled chamber communicating with said porous member to establish a vacuum pressure corresponding to the moisture percentage of the surrounding soil, and a vacuum responsive element; said element being arranged, subject to said timer means, to cause operation of said actuator means when soil moisture in proximity to said device is depleted to a predetermined minimum value, said device maintaining said actuating means in condition for operation irrespective of the operation or inoperation of said timer means until the soil moisture in the vicinity of said porous member reaches field capacity.

9. An apparatus for automatically irrigating plants, comprising: a series of sprinkler sections each having at least one irrigation outlet and a control valve therefor; means for actuating said sprinkler sections in sequence; and a device including a porous member exposed to the soil to be irrigated, a closed liquid filled chamber communicating with said porous member to establish a vacuum pressure corresponding to the moisture percentage of the surrounding soil, and a vacuum responsive element; said element being arranged to cause operation of said actuator means when soil moisture in proximity to said device is depleted to a predetermined minimum value and to continue operation of said actuating means until said soil moisture reaches field capacity.

10. An apparatus for automatically irrigating plants, comprising: a porous cell adapted for physical contact with the soil; a vacuum sensitive operation initiating means at a station remote from said cell; tubing connecting said cell and means and defining therewith a closed system adapted to be filled with water whereby a vacuum pressure may develop in proportion to the moisture condition of the soil; and an irrigation system responsive to said operation initiating means.

References Cited in the file of this patent

UNITED STATES PATENTS

| Number | Name | Date |
|---|---|---|
| 1,520,132 | Johnson | Dec. 23, 1924 |
| 1,568,214 | Elder | Jan. 5, 1926 |
| 1,710,362 | Korneff | Apr. 22, 1929 |
| 1,984,946 | Sauerhoff | Dec. 18, 1934 |
| 1,995,851 | Hammell | Feb. 19, 1935 |
| 2,023,490 | Richards | Dec. 10, 1935 |
| 2,031,146 | Dodge | Feb. 18, 1936 |
| 2,075,487 | Van Zandt | Mar. 30, 1937 |
| 2,084,005 | Richards | June 15, 1937 |
| 2,149,899 | Pfeffer | Mar. 7, 1939 |
| 2,284,158 | Lewis | May 26, 1942 |
| 2,341,041 | Hauser | Feb. 8, 1944 |
| 2,445,717 | Richards | July 20, 1948 |